United States Patent Office 3,749,762
Patented July 31, 1973

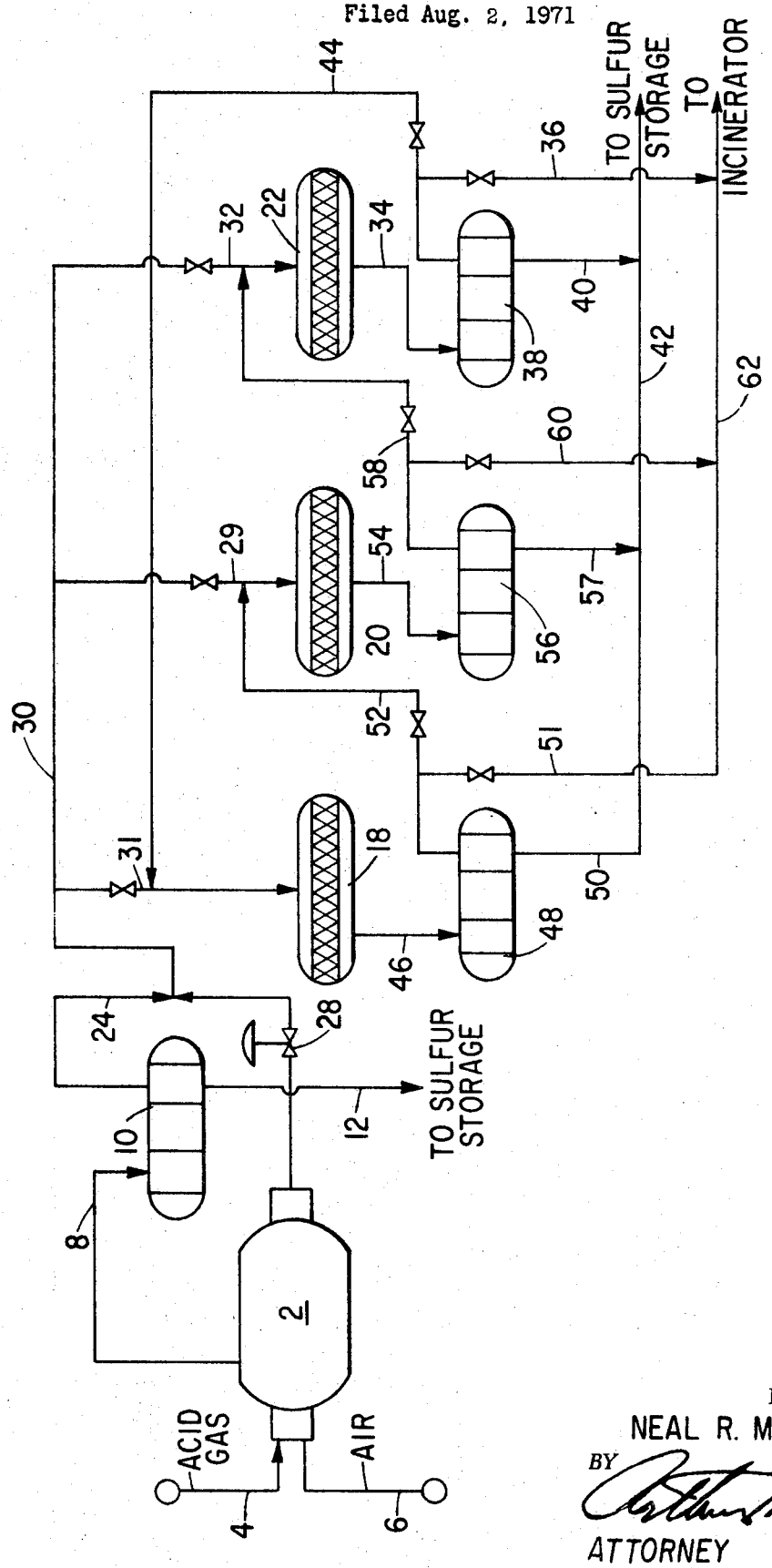

3,749,762
PROCESS FOR PRODUCING SULFUR FROM SOUR GAS
Neal R. Montgomery, Tulsa, Okla., assignor to Amoco Production Company, Tulsa, Okla.
Filed Aug. 2, 1971, Ser. No. 168,304
Int. Cl. C01b 17/04
U.S. Cl. 423—574                    5 Claims

ABSTRACT OF THE DISCLOSURE

This invention provides a process for recovering sulfur from sour gases taking advantage of the increased recovery obtained by the use of low temperature reactors. In a three-reactor plant the feed stream is alternately fed in clockwise sequence to each of the three reactors under low temperature conditions. The cycle of operation for each reactor follows the sequence: Claus reaction, cooling, cleanup and regeneration. By this procedure, recoveries in excess of 99 percent are possible.

---

The present invention relates to a method for the production of free sulfur from hydrogen sulfide. More particularly, it is concerned with an improved method for the recovery of free sulfur from sour gas streams by the catalytic conversion of hydrogen sulfide thereto under conditions such that unreacted sulfur compounds discharged to the atmosphere are held to a minimum.

BACKGROUND OF THE INVENTION

Attempts have been made in the past to increase the catalytic conversion of hydrogen sulfide gaseous streams to free sulfur by conducting a portion of the reaction at temperatures below the sulfur dew point in an effort to remove additional sulfur compounds from the stack gases prior to their discharge. To accomplish such an operation required not only many large, expensive valves but also complicated piping arrangements.

In some instances when a three-reactor plant was employed wherein any one of the reactors at a given time could operate at temperatures below the sulfur dew point, a total of 18 valves were required to obtain such flexibility. The use of so many valves in the flow lines can present operating problems. This number of valves has been reduced to 12 by allowing one reactor to operate as a Claus reactor while the other two reactors operate alternately at temperatures above and below the sulfur dew point as described and claimed in copending application Ser. No. 155,050, filed June 21, 1971, by Clifton S. Goddin, Jr. et al. Other procedures taking advantage of the increased level of conversion of hydrogen sulfide at the lower temperatures have been proposed. However, they employed an inert gas to regenerate catalyst beds that had become relatively unreactive as a result of sulfur deposition. The disadvantage encountered in this procedure was that under the regeneration conditions the reverse Claus reaction occurred, i.e., the free sulfur on the catalyst reacted with water vapor in the regeneration gas to convert the sulfur to hydrogen sulfide and sulfur dioxide, thus lowering the efficiency of the process.

DESCRIPTION OF THE INVENTION

I have now discovered an even still more simplified process and arrangement of equipment for the improved recovery of sulfur from sour gases whereby one is able to take advantage of the high hydrogen sulfide conversion characteristic of the "low temperature," i.e., 270°–300° F., condition and at the same time employ only one-half to three-fourths of the valving previously required for three-reactor plants in which at the same time one reactor operates under low temperature conditions.

The sequence of reactors in the various operations is built into the piping arrangement and cannot be changed without changing the piping. It is through this feature that it is possible to carry out the process—taking advantage of high conversions obtained at low temperature conditions—by the use of only 9 valves. The partial opening of the valves in the feed lines to their respective reactors, as will be discussed in detail below, permits one to use only one bypass reheat valve and one temperature controller while other methods require two of each. The process of my invention is also simplified over prior procedures by the use of only one steam production level on the shell side of all condensers and allows for the consolidation of equipment.

DESCRIPTION OF A PREFERRED EMBODIMENT OF THE INVENTION

The process of my invention will be further illustrated by reference to the accompanying drawing showing the adaptation of the invention to a conventional "straight-through" plant.

Before going into the details of the procedure involved, it might be well to include the following schedule to show the various sequence of operations occurring in the three reactors. The description, when interpreted in view of such schedule, will make the process of my invention more readily understood. Also shown below are representative time periods for each operating condition to which a given reactor is subjected. Thus, for a complete cycle in which a given reactor goes, for example, from one generation step to the next, an interval of 36 hours is required.

SCHEDULE

| Step No. in cycle | Condition in— | | | Time for given step, hours |
|---|---|---|---|---|
| | Reactor 18 | Reactor 20 | Reactor 22 | |
| 1 | Claus | Cleanup | Regeneration | 7 |
| 2 | Cooling | do | Claus | } 12 |
| 3 | Cleanup | Regeneration | do | |
| 4 | do | Claus | Cooling | 2 |
| 5 | Regeneration | do | Cleanup | } 15 |
| 6 | Claus | Cooling | do | |

Referring now to the accompanying drawing, an acid gas feed is introduced into combination furnace and boiler 2 via line 4. Air required for the reaction is added through line 6, mixed with the acid gas and burned in the furnace. A portion of the gases containing hydrogen sulfide, sulfur dioxide and free sulfur is taken through line 8 to condenser 10 where liquid sulfur is withdrawn via line 12. Bypass reheat gas at about 850° F. is withdrawn from the boiler section via line 26.

Let us first consider the flow scheme during the portion of the cycle when reactor 18 is operating under Claus conditions, reactor 20 is at low temperature or cleanup conditions and reactor 22 is being regenerated. Hot regeneration gas is provided by taking condenser 10 effluent at 375° F. via line 24 and blending it with 850° C. gas in line 26 to yield a 450–700° F. regeneration gas. Flow of the reheat gas is set by temperature control valve 28. The resulting stream—preferably at 700° F. for regeneration purposes—is sent to reactor 22 through line 30 and open valved line 32. Valved line 29 is closed while valved line 31 is partially open. The Claus reaction occurs to some extent in reactor 22 with generation of additional heat. The sulfur that has deposited on the catalyst in reactor 22 from the previous cleanup cycle is vaporized into the hot gas which flows out through line 34.

During the period when the bulk of the vaporization of the sulfur occurs, there is very little, if any, temperature increase in reactor effluent. Completion of the sulfur removal from the catalyst surface is evidenced by a noticeable temperature rise in the reactor effluent. Thus, the effluent in valved line 34 which is now at 600°–700° F. passes into condenser 38, operating at 270° F., where the product sulfur is converted into liquid form and removed therefrom via lines 40 and 42. Condenser 38 effluent is taken off via valved line 44, while valved line 36 is closed, at a temperature of about 270° F. and transferred to partially opened valved line 31 where it is blended with enough 700° F. gas in line 30 to give a reaction mixture having a temperature of about 450° F. which then flows into reactor 18 wherein the normal Claus reaction occurs. Product gas at a temperature above the sulfur dew point is withdrawn through line 46 and transferred to condenser 48 where liquid sulfur is formed and removed therefrom via lines 50 and 42. Condenser 48 effluent is removed at about 270° F. through line 52 and transferred to reactor 20 operating in this phase of the cycle as a low temperature cleanup reactor. Valved line 51 remains closed. While this reactor is operating in the cleanup position, product gas therefrom is withdrawn through line 54 and sent to condenser 56 to separate sulfur in liquid form from the unconverted gases and the liquid sulfur removed via lines 57 and 42. Condenser 56 effluent which now consists primarily of water vapor, nitrogen and small amounts of sulfur dioxide and hydrogen sulfide is taken off through closed valved line 58, open valved line 60 and sent to an incinerator (not shown) through line 62. When the regeneration outlet temperature in line 34 has been maintained at 600°–700° F. for the requisite time, the flow of gas via lines 24 and 26 is adjusted so that the temperature of the resulting mix is about 450° F. This gas is then directed to reactor 22 through lines 30 and 32. The effluent from reactor 22 is treated as described above except the valve in line 31 is closed, thus permitting the gas entering reactor 18 to be at a temperature of about 270° F., resulting in cooling the catalyst bed therein.

This is likewise true for the operating conditions employed in reactor 20 which is still on cleanup wherein the conversion to free sulfur occurs at a very high level. This high recovery operation is continued until the sulfur buildup on the catalyst in reactor 20 is such that regeneration is required as evidenced by a decline in reactor temperature, after which the valve in line 29 is opened and the valve in line 32 is partially closed. Reactor 20 now undergoes regeneration, as previously described with reference to reactor 22, by the introduction of feed gas at 700° F. through line 29. The hot effluent emerges via line 54 and flows into condenser 56 from which liquid sulfur is removed via lines 57 and 42. In removing the effluent, line 60 is closed and the valve in line 58 opened, thereby permitting gas at 270° F. to be blended with enough 700° F. gas in line 32 to produce a 450° F. feed gas for reactor 22. The 600° F. effluent from reactor 22 is cooled in condenser 38 and the uncondensed portion at 270° F. returned via lines 44 and 31 to reactor 18 which is now operated under cleanup or low temperature conditions with product gas being cooled in condenser 48 and all of the effluent therefrom being taken through lines 51 and 62 to the incinerator, the valve in line 52 having been closed in the meantime.

At this stage of the process none of the reactors needs to be regenerated. Accordingly, reactor 18 continues to operate in the cleanup position, reactor 20 is operated as a Claus reactor by blending the gas in lines 24 and 26 so that the resultant mixture in lines 30 and 29 is at about 450° F. In the meantime, the valves in lines 31 and 32 are closed temporarily, permitting all of the feed to flow into reactor 20. Reactor 22 which was operated as a Claus reactor in the previous cycle is now on cooling. Cool effluent from condenser 38 serves as feed (270° F.) for cleanup reactor 18.

When the cleanup cycle in reactor 18 must be terminated, as evidenced by a decrease in catalyst activity, the flow lines are again switched, with 700° F. gas coming into reactor 18 through line 31 to regenerate it. The sulfur and unconverted gases in the effluent therefrom are then run into condenser 48, separated, and condenser 48 effluent blended with enough 700° F. gas in line 29 to produce a feed mixture having a temperature of 450° F. In this operation, line 58 is opened and the valve in line 60 is closed, resulting in a cooled effluent (270° F.) flowing into reactor 22 now being operated as a cleanup reactor. Condenser 38 effluent under these conditions is taken off via line 44 (the valve therein being closed) and open line 36, ultimately passing out of the system via line 62.

In the final cycle there again is no regeneration step occurring in any of the three reactors. The valve in line 31 is open while those in lines 29 and 32 are closed. Reactor 18 is operated as a Claus reactor as has been previously described, with reactor 20 being cooled and reactor 22 continuing to operate as a cleanup reactor. To accomplish this last cycle, the valves in lines 29 and 32 remain closed while valved line 31 is still open. Also, valved lines 51, 60 and 44 are closed while line 36 is open. When this cycle is ready to terminate, the entire procedure as described herein can then be repeated.

It will be apparent, of course, that a number of modifications of the foregoing procedure may be made without departing from the scope of my invention. For example, reactors 18, 20 and 22 could be grouped in a single shell with individual product gas lines therefrom flowing into a single condenser shell, with the resulting liquid sulfur from each of said lines being commingled and removed from the system. The respective condenser effluents could then be processed as described above.

An additional advantage of the present invention is that it requires only three valves, i.e., the valves in lines 29, 31 and 32, to be subjected to high temperatures (600°–700° F.) while the remaining six valves in lines 36, 40, 51, 52, 58 and 60 are exposed to substantially lower temperatures, i.e., 270°–300° F. Valves required for high temperature conditions are generally constructed of stainless steel whereas the low temperature valves can be made of carbon steel and cost less than half as much as those made from stainless steel. For example, stainless steel valves of the type required in the process of my invention for a 30-inch line cost about $7,900 each whereas carbon steel valves of the same size are only about $3,100 each. As pointed out previously, prior designs required as many as 12 to 18 such valves, approximately half of which had to be stainless steel.

I claim:

1. In a process for the catalytic conversion of a gaseous feed mixture containing $H_2S$ and $SO_2$, the improvement comprising:

(1) introducing a major portion of said mixture into a first catalyst bed having free sulfur deposited thereon, said major portion being maintained within said bed at a temperature of from about 600° to about 700° F. whereby the sulfur on said catalyst is removed therefrom in the form of a vaporous mixture containing $H_2S$ and $SO_2$, (2) separating the sulfur in said vaporous mixture from the unreacted $H_2S$ and $SO_2$, (3) introducing the remainder of said mixture plus said unreacted $H_2S$ and $SO_2$ into a second catalyst bed to form additional sulfur at a temperature of from about 425°–450° F., (4) withdrawing a product gas from said second bed and separating sulfur from said product gas, (5) introducing the resulting sulfur-denuded gas into a third catalyst bed at a temperature such that the reaction is below its sulfur dew point whereby free sulfur is deposited on said third catalyst bed and removing third catalyst bed effluent from the system, (6) continuing the introduction of said feed mixture into said first bed until the effluent therefrom increases in temperature denoting essentially complete removal of sulfur from said first bed, after which the temperature of said feed mixture is reduced substantially but is still maintained at a level sufficient to produce a first bed effluent temperature of about 600° F., (7) withdrawing a product stream from said first bed and separating sulfur therefrom, (8) introducing the resulting sulfur-denuded stream into said second bed, said stream within said bed being maintained at a temperature below its sulfur dew point whereby sulfur is deposited on the catalyst in said second bed, (9) withdrawing reaction products from said second bed and removing sulfur therefrom to obtain a sulfur-denuded stream,

(10) thereafter passing the last-mentioned stream into said third bed operating at substantially the same conditions as Step (5) until the activity of the catalyst therein decreases,

(11) switching the introduciton of said feed mixture from the first to the third of said beds, and

(12) repeating the above cycle in which the flow sequence is from the third to the first to the second catalyst beds.

2. The process of claim 1 wherein the inlet feed temperature to the third catalyst bed in Steps (5) and (10) ranges from about 270°–300° F.

3. The process of claim 1 in which the temperature of the sulfur-denuded stream in Step (8) ranges from about 270°–300° F.

4. The process of claim 1 in which said feed mixture is derived from a sour natural gas.

5. The process of claim 1 in which said feed mixture is derived from a sour refinery gas.

References Cited

UNITED STATES PATENTS

| 2,785,056 | 3/1957 | Thumm et al. | 23—225 P |
| 2,742,346 | 4/1956 | Miller | 23—225 P |

FOREIGN PATENTS

| 722,038 | 1/1955 | Great Britain | 23—225 P |

GEORGE O. PETERS, Primary Examiner

PO-1050
(5/69)

UNITED STATES PATENT OFFICE
CERTIFICATE OF CORRECTION

Patent No. 3,749,762            Dated    July 31, 1973

Inventor(s)   Neal R. Montgomery

It is certified that error appears in the above-identified patent and that said Letters Patent are hereby corrected as shown below:

Column 1, line 32, "conversion" should read -- conversion -- (In the specification, page 2, line 18).

Column 2, line 58, "850°C." should read -- 850°F. -- (In the specification, page 5, line 2).

Claim 1, column 5, line 18, "introduciton" should read -- introduction -- (In the specification, Claim 1, line 33).

Signed and sealed this 27th day of November 1973.

(SEAL)
Attest:

EDWARD M. FLETCHER, JR.          RENE D. TEGTMEYER
Attesting Officer               Acting Commissioner of Patents